United States Patent [19]

Edmonds, Jr.

[11] 4,096,132

[45] Jun. 20, 1978

[54] PRODUCTION OF P-PHENYLENE SULFIDE POLYMERS

[75] Inventor: James T. Edmonds, Jr., Bartlesville, Okla.

[73] Assignee: Phillips Petroleum Company, Bartlesville, Okla.

[21] Appl. No.: 581,344

[22] Filed: May 27, 1975

[51] Int. Cl.$^2$ ............................................. C08F 28/00
[52] U.S. Cl. ...................................... 260/79.1; 260/79
[58] Field of Search .................................. 260/79, 79.1

[56] References Cited

U.S. PATENT DOCUMENTS

| | | | |
|---|---|---|---|
| 3,562,199 | 2/1971 | Hill, Jr. et al. | 260/79 |
| 3,607,843 | 9/1971 | Vidaurri, Jr. | 260/79 |
| 3,725,362 | 4/1973 | Walker | 260/79 |
| 3,763,124 | 10/1973 | Edmonds, Jr. | 260/79 |
| 3,786,035 | 1/1974 | Scoggin | 260/79 |
| 3,919,177 | 11/1975 | Campbell | 260/79.1 |

Primary Examiner—Melvyn I. Marquis

[57] ABSTRACT

A method is provided for producing a p-phenylene sulfide polymer by contacting at least one p-dihalobenzene, at least one alkali metal sulfide, at least one alkali metal carboxylate, at least one organic amide and at least one alkali metal hydroxide to form a composition at polymerization conditions. The use of an alkali metal hydroxide in addition to the other compounds used in the reaction mixture results in p-phenylene sulfide polymers of higher molecular weight than produced without the alkali metal hydroxide, as evidenced by lower melt flow of the polymer than produced by the compared methods.

12 Claims, No Drawings

PRODUCTION OF P-PHENYLENE SULFIDE POLYMERS

BACKGROUND OF THE INVENTION

This invention relates to the production of p-phenylene sulfide polymers. In one of its aspects this invention relates to a novel method for producing novel p-phenylene sulfide polymers; and to the polymers themselves. In another of its aspects this invention relates to producing p-phenylene sulfide polymers of higher molecular weight using a specific chemical compound in the reaction mixture than are produced without using the specific chemical compound in the reaction mixture. In yet another of its aspects this invention relates to the use of an alkali metal hydroxide in the reaction mixture in the production of p-phenylene sulfide polymers.

The preparation of p-phenylene sulfide polymers having higher molecular weight as evidenced by lower melt flow without curing the polymers as compared to p-phenylene sulfide polymers knonw in the art is of particular interest since lower melt flows, particularly within the range of 1 to about 700 as determined by the method of ASTM D 1238-70, are particularly useful in the production of fibers, molded objects and filaments since the usual curing step is obviated.

It is therefore an object of this invention to produce p-phenylene sulfide polymers of increased molecular weight as compared to those produced by prior art methods.

Other aspects, objects and the various advantages of this invention will become apparent upon reading this specification and the appended claims.

STATEMENT OF THE INVENTION

In accordance with this invention, in the production of a p-phenylene sulfide polymer by contacting at least one p-dihalobenzene, at least one alkali metal sulfide, at least one alkali metal carboxylate, and at least one organic amide to form a composition, as in copending application 495,450, filed August 8, 1974, now U.S. Pat. No. 3,919,177, the admixing, additionally, of at least one alkali metal hydroxide results in a p-phenylene sulfide polymer of lower melt flow than that obtained without the addition of an alkali metal hydroxide to the composition.

In one embodiment of the present invention, at least one p-dihalobenzene is reacted, under polymerization conditions for a period of time sufficient to form a p-phenylene sulfide polymer, with a mixture in which at least one alkali metal sulfide, at least one alkali metal carboxylate, at least one alkali metal hydroxide, and at least one organic amide are contacted.

p-Dihalobenzenes which can be employed in the process of this invention can be represented by the formula

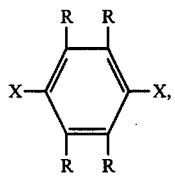

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Alakali metal sulfides which can be employed in the process of this invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture.

Alkali metal carboxylates which can be employed in the process of this invention can be represented by the formula $R'CO_2M$, where $R'$ is a hydrocarbyl radical selected from alkyl, cycloalkyl, and aryl, and combinations thereof such as alkaryl, aralkyl, and the like, the number of carbon atoms in said $R'$ being within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

Alkali metal hydroxides which can be employed in the process of this invention include lithium hydroxide, sodium hydroxide, potassium hydroxide, rubidium hydroxide, cesium hydroxide, and mixtures thereof.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N,-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1. The mole ratio of alkali metal carboxylate to alkali metal sulfide can vary over a wide range but generally will be within the range of about 0.05:1 to about 4:1, preferably about 0.1:1 to about 2:1. Although the mole ratio of alkali metal hydroxide to alkali metal sulfide can vary over a considerable range, generally it will be within the range of about 0.008:1 to about 0.8:1, preferably about 0.015:1 to about 0.6:1. The amount of organic amide can vary greatly, generally being within the range of about 100 grams to about 2500 grams per gram-mole of alkali metal sulfide.

Although the reaction temperatures at which the polymerization is conducted can vary over a wide range, generally it will be within the range of about 125° C to about 450° C, preferably about 175° C to about 350° C. The reaction time can vary widely, depending in part on the reaction temperature, but generally will be within the range of about 10 minutes to about 72 hours, preferably about 1 hour to about 8 hours. The pressure should be sufficient to maintain the p-dihalobenzene and organic amide substantially in the liquid phase.

It is to be understood that the process of this invention can be carried out by mixing the p-dihalobenzene, the alkali metal sulfide the alkali metal carboxylate, the alkali metal hydroxide, and the organic amide in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances water can be removed from the resulting composition, e.g., by distillation. For instance, water can be removed by distillation from a mixture of the organic amide, the alkali metal hydroxide, the alkali metal carboxylate, e.g., as a hydrate, and the alkali metal sulfide in hydrated form or as an aqueous mixture, after which the residual mixture can be admixed with the p-dihalobenzene and the resulting mixture then maintained at polymerization conditions.

The p-phenylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

The p-phenylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers. Those p-phenylene sulfide polymers having a relatively low melt flow, e.g., within the range of about 50 to about 700 (determined by the method of ASTM D 1238-70, modified to a temperature of 316° C using a 5-kg weight, the value being expressed as g/10 min.), are particularly useful in the production of fibers, molded objects, and films since the usual curing step is obviated.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution.

EXAMPLES I - IX

In a series of runs, poly(p-phenylene sulfide) was prepared in the following manner. Sodium sulfide (983.7 g, 60 percent assay, 7.56 moles), lithium acetate dihydrate (765 g, 7.50 moles), sodium hydroxide in varying amounts, and N-methyl-2-pyrrolidone (3000 ml, 3078 g) were charged to a stirred 2-gallon autoclave, which was then flushed with nitrogen. Additionally, a control run was conducted in which no sodium hydroxide was employed. In each of the runs the mixture was then dehydrated by heating to 400°–410° F (204°–210° C), giving a distillate comprising primarily water. To the residual mixture were charged 1137 g (7.73 moles) p-dichlorobenzene and 500 ml (513 g) N-methyl-2-pyrrolidone. The resulting mixture was heated for 3 hours at 510° F (266° C) at a maximum pressure within the range of 150–170 psig. The reaction product was cooled, washed four times with water, and dried in a vacuum over to obtain the poly(p-phenylene sulfide). Yield, melt flow, and inherent viscosity of the polymer produced in each of the runs are shown in Table I.

TABLE I

| Example | Sodium Hydroxide Grams | Sodium Hydroxide Moles | Poly(p-phenylene sulfide) Yield, g | Melt Flow | Inherent Viscosity |
|---------|------|-------|----------|-----------|----------|
| I[a]    | 0    | 0     | 610      | 897       | 0.25     |
| II[a]   | 4.8  | 0.12  | 712      | 534       | 0.19     |
| III[a]  | 16.8 | 0.42  | 703      | 354       | 0.25     |
| IV      | 22.8 | 0.57  | 706      | 303       | 0.26     |
| V       | 34.8 | 0.87  | 706      | 222       | 0.36     |
| VI      | 46.8 | 1.17  | 707      | 165       | 0.31     |
| VII     | 69.6 | 1.74  | 663      | 148       | 0.30     |
| VIII    | 81.6 | 2.04  | 685      | 190       | 0.32     |
| IX      | 139.2| 3.48  | 605      | 332       | 0.32     |

[a]Gaseous carbon dioxide (50g) was added to reaction mixture, while cooling, to aid in subsequent filtration of polymer.

Thus, the poly-(p-phenylene sulfide) produced in Examples II through IX, conducted within the scope of the process of this invention, was of much lower melt flow than that produced in Example I, in which an alkali metal hydroxide was not employed.

EXAMPLE X

In the preparation of an arylene sulfide copolymer in a control run outside the scope of this invention, 983.7 g (60 percent assay, 7.56 moles) sodium sulfide, 765 g (7.50 moles) lithium acetate dihydrate, and 3000 ml (3078 g) N-methyl-2-pyrrolidone were charged to a stirred 2-gallon autoclave, which was then flushed with nitrogen. Dehydration of the mixture by heating to 402° F (206° C) yielded 635 ml of distillate comprising primarily water. To the residual mixture were charged 1078.7 g (7.34 moles) p-dichlorobenzene, 82.0 g (0.47 mole) 2,5-dichloro-p-xylene, and 500 ml (513 g) N-methyl-2-pyrrolidone. The resulting mixture was heated for 3 hours at 510° F (266° C) at a maximum pressure of 165 psig. Gaseous carbon dioxide (50 g) was then added to the reaction mixture, while cooling, to aid in subsequent filtration, and the resulting product was washed four times with water and dried in a vacuum oven to obtain a yield of 634.7 g of arylene sulfide copolymer containing

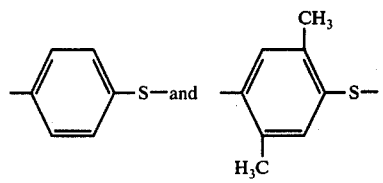

units, the copolymer having a melt flow of 2236 and an inherent viscosity of 0.19.

EXAMPLE XI

In the preparation of an arylene sulfide copolymer in a run within the scope of this invention, employing sodium hydroxide, 983.7 g (60 percent assay, 7.56 moles) sodium sulfide, 765 g (7.50 moles) lithium acetate dihydrate, 46.8 g (1.17 moles) sodium hydroxide, and 3000 ml (3078 g) N-methyl-2-pyrrolidone were charged to a stirred 2-gallon autoclave, which was then flushed with nitrogen. Dehydration of the mixture by heating to 406° F (208° C) yielded 725 ml of distillate comprising primarily water. To the residual mixture were charged 1078.7 g (7.34 moles) p-dichlorobenzene, 82.0 g (0.47 mole) 2,5 -dichloro-p-xylene, and 500 ml (513 g) N-methyl-2-pyrrolidone. The resulting mixture was heated for 3 hours at 510° F (266° C) at a maximum pressure of 160 psig. Gaseous carbon dioxide (50 g) was then added to the reaction mixture, while cooling, to aid in subsequent filtration, and the resulting product was washed four times with water and dried in a vacuum oven to obtain a yield of 682 g of arylene sulfide copolymer containing

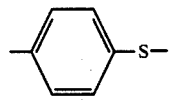

and

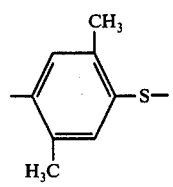

units, the copolymer having a melt flow of 447 and an inherent viscosity of 0.26.

Thus, the arylene sulfide copolymer produced in this Example was of much lower melt flow than produced in Example X, in which sodium hydroxide was not employed.

I claim:

1. In a method for producing polymers by:
   a. forming a composition consisting essentially of at least one p-dihalobenzene, at least one alkali metal sulfide, at least one alkali metal carboxylate, and at least one organic amide, and
   b. maintaining at least a portion of said composition at polymerization conditions to produce a polymer, the improvement of admixing at least one alkali metal hydroxide into said composition of (a) thereby effectively lowering the melt flow of the polymer produced.

2. A method of claim 1 wherein a first composition comprising:
   a. a mixture of at least one alkali metal sulfide, at least one alkali metal carboxylate, at least one alkali metal hydroxide, and at least one organic amide is formed, and
   b. at least a portion of said mixture is contacted with at least one p-dihalobenzene under polymerization conditions for a period of time sufficient to form a p-phenylene sulfide polymer.

3. A method of claim 1 wherein said p-dihalobenzene is represented by the formula

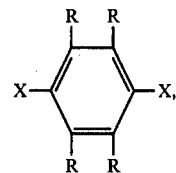

where each X is selected from the group consisting of chlorine, bromine, and iodine, and each R is selected from the group consisting of hydrogen and hydrocarbyl in which the hydrocarbyl is an alkyl, cycloalkyl, or aryl radical or combination thereof, the total number of carbon atoms in each molecule being within the range of 6 to about 24, with the proviso that in at least 50 mole percent of the p-dihalobenzene employed each R must be hydrogen.

4. A method of claim 2 wherein the p-dihalobenzene is represented by the formula

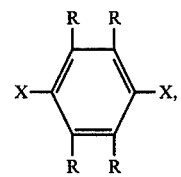

where each X is selected from the group consisting of chlorine, bromine, and iodine, and each R is selected from the group consisting of hydrogen and hydrocarbyl in which the hydrocarbyl is an alkyl, cycloalkyl, or aryl radical or combination thereof, the total number of carbon atoms in each molecule being within the range of 6 to about 24, with the proviso that in at least 50 mole percent of the p-dihalobenzene employed each R must be hydrogen.

5. A method of claim 3 wherein the mole ratio of p-dihalobenzene to alkali metal sulfide is within the range of about 0.9:1 to about 2:1, the mole ratio of alkali metal carboxylate to alkali metal sulfide is within the range of about 0.05:1 to about 4:1, and the mole ratio of alkali metal hydroxide to alkali metal sulfide is within the range of about 0.008:1 to about 0.8:1.

6. A method of claim 4 wherein the mole ratio of p-dihalobenzene to alkali metal sulfide is within the range of about 0.9:1 to about 2:1, the mole ratio of alkali metal carboxylate to alkali metal sulfide is within the range of about 0.05:1 to about 4:1, and the mole ratio of alkali metal hydroxide to alkali metal sulfide is within the range of about 0.008:1 to about 0.8:1.

7. A method of claim 5 wherein the polymerization conditions present comprise a reaction temperature within the range of about 125° C to about 450° C, a pressure sufficient to maintain the p-dihalobenzene and organic amide substantially in the liquid phase and the reaction time is in the range of about 10 minutes to about 72 hours.

8. A method of claim 6 wherein the polymerization conditions present comprise a reaction temperature within the range of about 125° C to about 450° C, a pressure sufficient to maintain the p-dihalobenzene and organic amide substantially in the liquid phase and the reaction time is in the range of about 10 minutes to about 72 hours.

9. A method of claim 7 wherein said alkali metal hydroxide is chosen from lithium hydroxide, sodium hydroxide, potassium hydroxide, rubidium hydroxide, cesium hydroxide, and mixtures thereof.

10. The method of claim 8 wherein said alkali metal hydroxide is chosen from lithium hydroxide, sodium hydroxide, potassium hydroxide, rubidium hydroxide, cesium hydroxide, and mixtures thereof.

11. The method of claim 10 wherein said p-dihalobenzene is p-dichlorobenzene, said alkali metal sulfide is sodium sulfide, said alkali metal carboxylate is lithium acetate dihydrate, said organic amide is N-methyl-2-pyrrolidone, and said alkali metal hydroxide is sodium hydroxide, and the reaction temperature is within the range of about 175° C to about 350° C and the reaction time is within the range of about 1 hour to about 8 hours.

12. The method of claim 10 wherein said alkali metal sulfide is sodium sulfide, said alkali metal carboxylate is lithium acetate dihydrate, said organic amide is N-methyl-2-pyrrolidone, said alkali metal hydroxide is sodium hydroxide and said p-dihalobenzene is a mixture of p-dichlorobenzene and 2,5-dichloro-p-xylene, and the reaction temperature is within the range of about 175° C to about 350° C and the reaction time is within the range of about 1 hour to about 8 hours to produce a polymer comprising a copolymer containing the units

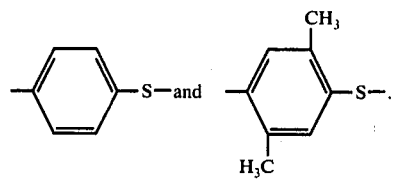

* * * * *